(12) United States Patent
Stieglitz et al.

(10) Patent No.: US 11,173,763 B2
(45) Date of Patent: Nov. 16, 2021

(54) CHASSIS LINK FOR A MOTOR VEHICLE

(71) Applicant: ZF FRIEDRICHSHAFEN AG, Friedrichshafen (DE)

(72) Inventors: Andre Stieglitz, Osnabrück (DE); Thomas Schwarz, Sigmarszell (DE); Ingolf Müller, Minfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/056,553

(22) PCT Filed: Apr. 29, 2019

(86) PCT No.: PCT/EP2019/060844
§ 371 (c)(1),
(2) Date: Nov. 18, 2020

(87) PCT Pub. No.: WO2019/223957
PCT Pub. Date: Nov. 28, 2019

(65) Prior Publication Data
US 2021/0206219 A1 Jul. 8, 2021

(30) Foreign Application Priority Data
May 25, 2018 (DE) ...................... 10 2018 208 282.0

(51) Int. Cl.
*B60G 7/00* (2006.01)
*B29C 70/52* (2006.01)
(Continued)

(52) U.S. Cl.
CPC .............. *B60G 7/001* (2013.01); *B29C 70/52* (2013.01); *B29K 2031/00* (2013.01);
(Continued)

(58) Field of Classification Search
CPC .............. B60G 7/001; B60G 2206/012; B60G 2206/11; B60G 2206/7101; B29C 70/52;
(Continued)

(56) References Cited

U.S. PATENT DOCUMENTS

| 9,227,375 B2 * | 1/2016 | Carrere .................... B32B 1/08 |
| 11,097,584 B2 * | 8/2021 | Muller ................... B60G 7/001 |
| 2013/0112309 A1 * | 5/2013 | Stewart ............... B29C 37/0085 138/140 |

(Continued)

FOREIGN PATENT DOCUMENTS

| DE | 102010053843 | 6/2012 |
| DE | 102011053480 | 12/2012 |

(Continued)

OTHER PUBLICATIONS

International Preliminary Patentability Report of PCT/EP2019/060844.

*Primary Examiner* — Darlene P Condra
(74) *Attorney, Agent, or Firm* — Cozen O'Connor

(57) ABSTRACT

A component part for a motor vehicle having a hollow profile portion of a fiber-reinforced plastic and a load introduction element of a metal material. The hollow profile portion and the load introduction element are connected in a common connection portion via a nondetachable, glued plug-in connection in which an end portion of the load introduction element and an end portion of the hollow profile portion engage in one another by positive engagement. The end portion of the load introduction element has a spline with teeth extending in longitudinal direction of the common connection portion so that the stiffness of the end portion of the load introduction element reduced in longitudinal direction of the common connection portion.

18 Claims, 6 Drawing Sheets

(51) Int. Cl.
  *B29K 31/00* (2006.01)
  *B29L 31/00* (2006.01)
  *B29L 31/30* (2006.01)

(52) U.S. Cl.
  CPC . *B29L 2031/003* (2013.01); *B29L 2031/3002* (2013.01); *B60G 2206/012* (2013.01); *B60G 2206/11* (2013.01); *B60G 2206/7101* (2013.01)

(58) Field of Classification Search
  CPC .............. B29C 66/1248; B29C 66/524; B29C 66/5243; B29C 66/12441; B29C 65/5085; B29C 65/48; B29C 66/52431; B29C 66/5244; B29C 66/52451; B29C 66/534; B29C 66/721; B29C 66/742; B29K 2031/00; B29L 2031/003; B29L 2031/3002; B29L 2031/75; F16C 2226/40; F16C 7/026
  See application file for complete search history.

(56) References Cited

U.S. PATENT DOCUMENTS

| | | | | |
|---|---|---|---|---|
| 2014/0112708 | A1* | 4/2014 | Carrere | B32B 1/08 |
| | | | | 403/265 |
| 2014/0137700 | A1* | 5/2014 | Fiedler | F16C 7/026 |
| | | | | 74/579 R |
| 2015/0259511 | A1* | 9/2015 | Nakano | C08K 7/14 |
| | | | | 524/494 |
| 2018/0354328 | A1* | 12/2018 | Tatsumi | B60G 7/001 |
| 2019/0143776 | A1* | 5/2019 | Muller | B60G 7/001 |
| | | | | 280/124.134 |
| 2020/0139776 | A1* | 5/2020 | Rupflin | B29C 66/524 |

FOREIGN PATENT DOCUMENTS

| | | |
|---|---|---|
| DE | 102016211212 | 12/2017 |
| EP | 2722533 | 4/2014 |
| WO | WO 2013066565 | 5/2013 |
| WO | WO 2018197136 | 11/2018 |

* cited by examiner

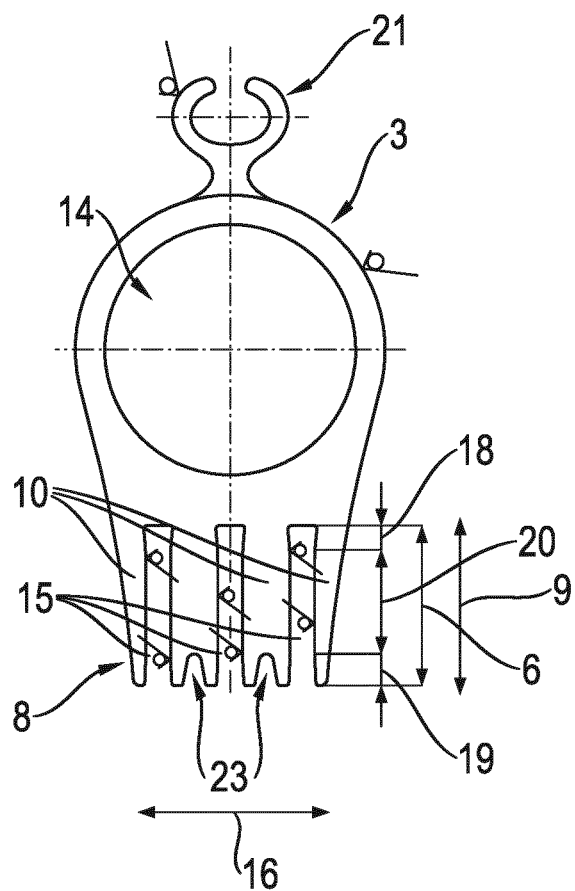
Fig. 3
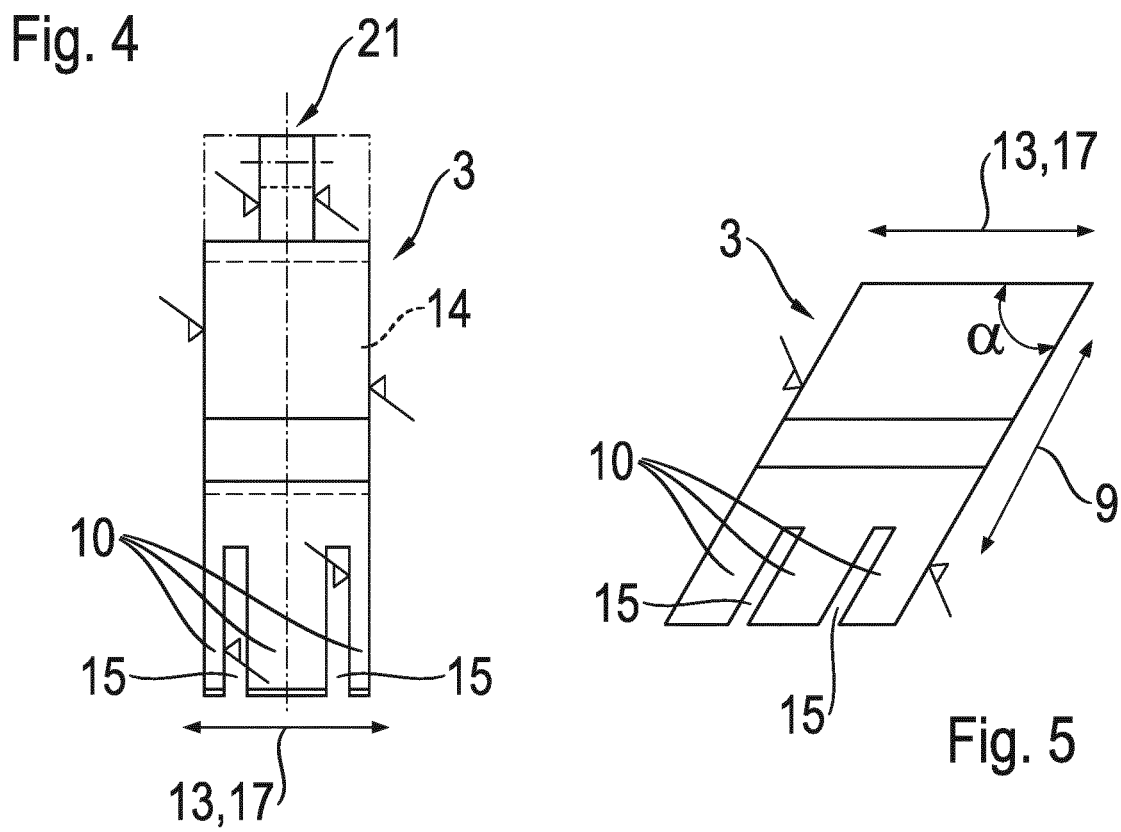
Fig. 4
Fig. 5

CHASSIS LINK FOR A MOTOR VEHICLE

CROSS REFERENCE TO RELATED APPLICATIONS

This is a U.S. national stage of Application No. PCT/EP2019/060844 filed Apr. 29, 2019. Priority is claimed on German Application No. DE 10 2018 208 282.0 filed May 25, 2018 the content of which is incorporated herein by reference.

BACKGROUND OF THE INVENTION

1. Field of the Invention

The invention is directed to a component part for a motor vehicle, having a hollow profile portion made of a fiber-reinforced plastic and a load introduction element made of a metal material.

2. Description of Related Art

Component parts for motor vehicles having a hollow profile portion made of a fiber-reinforced plastic and a load introduction element made of a metal material are known from the prior art. A strut-shaped component part of fiber-reinforced plastic which is formed as a tubular hollow profile is disclosed in DE 10 2010 053 843 A1. The strut-shaped component part is connected via a nondetachable plug-in connection to a load introduction element, referred to as intermediate piece, made of a metal material. The nondetachable plug-in connection is formed as an adhesive connection. To produce the adhesive connection, one end of the strut-shaped component part is first coated with an adhesive layer. Subsequently, the end which is coated in this way is inserted into a sleeve-shaped receiving space of the load introduction element, whereupon the adhesive layer comes in contact with the walls of the sleeve-shaped receiving space and deploys its function. The end of the strut-shaped component part is glued externally circumferentially to an inner wall of the sleeve-shaped receiving space. In this arrangement, the load is introduced into the strut-shaped component part of fiber-reinforced plastic only via the outer circumference of the tubular hollow profile end. Therefore, the load is not introduced uniformly into the hollow profile so that, in the connection area in which the two mating members are glued to one another, the areas of the hollow profile end near the outer circumference are stressed more than the areas of the hollow profile end near the inner circumference. Under critical load, a failure occurs in that the outer layer of the hollow profile end near the outer circumference is detached from the rest of the hollow profile end. In practical terms, this means that the edge layer of the hollow profile end breaks off. When a bending load occurs on the hollow profile, in particular on the hollow profile end, the hollow profile is supported only slightly so that stress risers result locally at the transition from the glued-in hollow profile end to the free hollow profile area.

Component parts for motor vehicles of the above-mentioned type are known from WO 2018/197136 A1 and EP 2 722 533 A1.

SUMMARY OF THE INVENTION

It is an object of one aspect of the invention to provide a component part for a motor vehicle formed as a lightweight component part at least partially comprising fiber-reinforced plastic and by which relatively high loads can be transmitted at the same time.

Accordingly, one aspect of the invention provides a component part for a motor vehicle. The component part has a hollow profile portion made from a fiber-reinforced plastic and a load introduction element made from a metal material. The hollow profile portion and the load introduction element are connected to one another in a common connection portion via a nondetachable, glued plug-in connection. In the plug-in connection, an end portion of the load introduction element and an end portion of the hollow profile portion mutually engage in one another at least substantially by positive engagement. According to one aspect of the invention, the component part is formed as a chassis link for a motor vehicle, and the end portion of the load introduction element has a spline with teeth extending at least substantially in longitudinal direction of the common connection portion so that the stiffness of the end portion of the load introduction element is reduced in longitudinal direction of the common connection portion.

In particular, the hollow profile portion and the load introduction element are connected to one another in the common connection portion by an adhesive. The stresses in an adhesive of this type, for example, during tensile loading in a common connection portion as described above, are generally relatively high when a hollow profile portion is made of a fiber-reinforced plastic and, owing to the material, has an appreciably lower stiffness than a load introduction element made of metal, for example, aluminum. In the spline according to one aspect of the invention, the stiffness of the load introduction element in the common connection portion of the hollow profile portion and load introduction element is reduced in longitudinal direction of the connection portion through geometric steps, namely, through the spline. The end portion of the load introduction element is not formed solid in the area of the spline, but rather is reduced by the volume of intermediate spaces between the teeth. In particular, the stiffness of the end portion of the load introduction element is reduced in longitudinal direction of the common connection portion during a tensile loading of the connection portion. A tensile loading of this kind tends to pull the end portion of the hollow profile portion out of the spline in longitudinal direction of the connection portion. The reason for the reduction in stiffness of the load introduction element in longitudinal direction of the common connection portion is that the teeth of the spline are more likely to undergo an elastic elongation in longitudinal direction of the connection portion under a tensile load than would be the case in a solid construction of the end portion of the load introduction element.

In particular, there is a reduced stiffness of the end portion of the load introduction element in longitudinal direction of the common connection portion also under a compressive load. In particular, this reduced stiffness results during compressive loading when the hollow profile portion is not inserted into the spline up to the stop in longitudinal direction of the common connection portion but rather a gap remains between a front side of the hollow profile portion facing the load introduction element and a base of the spline. In particular, this gap is filled with adhesive. In particular, the teeth have a length which is substantially at least twice as large as a maximum width of the teeth so that a relatively high elastic ductility of the spline in longitudinal direction of the common connection portion results during a tensile load as well as during a compressive load. A reduction in the stresses occurring in the adhesive layer can be achieved, particularly during a tensile loading of the chassis link, through the relatively thinly shaped teeth. This is also true for a compressive load when the above-described gap is present. In particular, the teeth are formed in one piece with the load introduction element. In particular, the longitudinal extension of the connection portion corresponds in longitudinal direction thereof to an insertion depth by which the hollow profile portion is inserted into the spline of the load introduction element. As has already been described, the hollow profile portion can be inserted in longitudinal direction of the connection portion into the spline up to the stop or can be spaced apart from this maximum position by the above-described gap. The spline is particularly advantageous during tensile and/or compressive stress but is also advantageous during torsional and/or flexural stress.

"Chassis link" within the framework of the present invention is a rod-shaped or other component part which is elongated in one or more spatial directions and suitable for transmitting forces and/or moments. The chassis link can be, for example, a two-point link, three-point link, four-point link or five-point link. The two-point link can be formed, for example, as an axle strut or as a torque support. Tensile and/or compressive forces, which are introduced into the hollow profile portion via the load introduction element(s), act primarily on the chassis link. Further, bending moments and/or torque moments may act on the chassis link. This may be the case, for example, when the chassis link is an axle strut, which undergoes not only tensile and compressive stresses brought about by acceleration and braking processes during driving operation but also flexural and torsional stresses caused by rolling movements of a vehicle body. The chassis link is, in particular, a built chassis link, i.e., a chassis link composed of a plurality of separately produced individual parts. This mode of construction has the advantage over a one-piece chassis link that, for example, the hollow profile portion can be produced with variable length so that different variants of the chassis link can be realized in a modular manner. In particular, the hollow profile portion has a cross-sectional shape that deviates from a circular ring shape because hollow profile portions with a circular ring-shaped cross section can be held merely by the adhesive under torsional stress in circumferential direction. However, cross-sectional shapes deviating from a circular shape may also be additionally supported in circumferential direction by positive engagement when the end portion of the load introduction element has correspondingly shaped supporting areas. The hollow profile portion preferably has a nonround cross-sectional shape.

As used herein, a load introduction element is an element operatively connected to the hollow profile portion and can introduce operating loads such as forces and/or moments into the hollow profile portion. In the context of one aspect of the present invention, a hollow profile portion is a portion of a continuous profile. The thicknesses of the hollow profile portion are dimensioned appreciably smaller relative to its cross section. The thicknesses of the hollow profile portion are preferably 10 to 20 percent, particularly preferably 10 to 15 percent, of the outer dimensions of the hollow profile portion when the latter has a cross-sectional geometry that can be circumscribed by a square which at least substantially contacts outer surfaces. When considered in cross section, the hollow profile portion has at least one void which is formed as a circumferentially closed chamber. In particular, the hollow profile portion has a constant cross-sectional geometry over its longitudinal extension. The hollow profile portion can be formed straight or curved over its longitudinal extension. Alternatively, aside from a supporting cross section that is constant along its longitudinal extension, the hollow profile portion can have additional function-integrating elements which likewise extend over the entire length of the hollow profile portion or only over a partial length. In the latter case in particular, however, a cross-sectional area of the hollow profile portion containing the function-integrating elements is initially also formed over the entire length thereof and is subsequently cut off if necessary, for example, by sawing. Function-integrating elements can serve, for example, to connect tubes or hoses for transporting liquid or as cable holders or as holder for sensor elements or actuating elements or as a support for electronic components, for example, for damage detection or as a mounting surface.

In particular, the load introduction element has an opening which is oriented perpendicular to the longitudinal direction of the connection portion. The opening can be formed in a pot-shaped manner with an opening, for example, for receiving a joint ball of a ball stud of a ball joint. Alternatively, the opening can also be formed as a through-opening, for example, with a cylindrical through-opening for receiving a molecular joint, also referred to as a clamp joint. In particular, the through-opening has an unmachined inner circumferential surface in the installed state. Alternatively, the load introduction element can have a through-opening which has an unmachined inner circumferential surface in the unfinished state but which, in the installed state, has a finish-machined inner circumferential surface produced by cutting. A steel bushing can be inserted into the through-opening. When the hollow profile portion is formed straight, the longitudinal direction of the connection portion corresponds to the longitudinal direction of the hollow profile portion. When the hollow profile portion is formed curved, the longitudinal direction of the connection portion corresponds to the longitudinal direction of a tangent to the end portion of the hollow profile portion. Also, when the hollow profile portion is formed curved, the longitudinal directions of the end portion of the hollow profile portion, of the end portion of the load introduction element and of the connection portion are at least substantially identical in order to ensure an at least relatively uniform transmission of forces and/or moments between the load introduction element and the hollow profile portion.

In particular, the length of the connection portion substantially corresponds to an outer dimension of the cross section of the hollow profile. Accordingly, the length of the connection portion is relatively large. This has an effect in particular during loading of the chassis link at higher temperatures when the adhesive softens somewhat under the influence of temperature and accordingly becomes more elastic. In this case, the adhesive joint is also stressed in the area of a tooth root when the chassis link undergoes a tensile stress. Accordingly, the relatively large length of the connection portion represents a kind of reserve load-carrying ability at relatively high ambient temperatures. An appreciably greater length of the connection portion does not then significantly increase the load carrying capacity of the joint between load introduction element and hollow profile portion. An appreciably smaller length of the connection portion leads to a reduction in the load carrying capacity. By stating that the end portion of the load introduction element and the end portion of the hollow profile portion engage in one another "at least substantially" by positive engagement, it is meant that the two end areas do not directly contact one another—at least not over the entire surface—but rather have a slight clearance with respect to one another, and this slight clearance is filled with an adhesive which is distributed in particular over the entire surface.

The fiber-reinforced hollow profile portion is, in particular, a pultruded hollow profile portion, i.e., a hollow profile portion produced by a pultrusion process. The pultrusion process is a method for cost-effective production of fiber-reinforced plastic profiles in a continuous operating sequence. In particular, the hollow profile portion has reinforcement fibers which are distributed over the entire profile cross section and extend in a longitudinal profile direction resulting in a high stiffness and strength in this direction. Advantageously, to prevent bending and/or buckling in the hollow profile portion, relatively large portions of stretched fibers are arranged in the edge areas of the profile cross section and are also distributed at the same time in longitudinal profile direction. In particular, all of the fibers are oriented in longitudinal direction of the hollow profile portion. In a preferred embodiment form, the hollow profile portion has a fiber volume content of approximately 65 percent in order to simultaneously achieve a high stiffness in longitudinal profile direction, a high flexural rigidity and a good force transmission of fibers in the hollow profile portion. A fiber volume content of between 50 percent and 75 percent is generally possible. Carbon fibers, glass fibers, aramid fibers or natural fibers which are embedded in a plastics matrix can be used in the hollow profile portion. The matrix system advantageously comprises a vinyl ester resin because it can be processed favorably by pultrusion with very good chemical and mechanical properties. In addition, vinyl ester resin has very good adhesion in combination with some important adhesives. Alternatively, an epoxy resin, a polyester resin, phenolic resin or polyurethane resin can be used as matrix material. In particular, the glued plug-in connection has an epoxy adhesive. Alternatively, other adhesives such as methyl methacrylate adhesives, for example, can also be used. A hollow profile portion that is designed especially for greater torsional stresses can be produced in the pultrusion process by means of inlaying, weaving in or wrapping fibers or woven fabrics that are oriented at +/−45 degrees relative to the longitudinal direction of the hollow profile portion and are at the same time integrated in walls of the hollow profile portion. Further, the pulwinding method that combines the pultrusion process with an additional winding process can also be used for producing the hollow profile portion.

In particular, the end portion of the load introduction element and the end portion of the hollow profile portion form free ends of the load introduction element and of the hollow profile portion. The load introduction element may be part of an articulated bearing of the chassis link or, alternatively, may serve to connect two or more hollow profile portions or may be part of an articulated bearing of the chassis link and serve at the same time to connect two or more hollow profile portions. In particular, the hollow profile portion is at least partially visible in the area of the connection portion, i.e., partially forms an outer circumferential surface of the connection portion. In particular, areas in which the hollow profile portion forms the outer circumferential surface of the connection portion are arranged flush with the areas in which the end portion of the load introduction element forms the outer circumferential surface of the connection portion. In particular, an adhesive at least partially forms the outer circumferential surface of the connection portion.

Advantageously, the teeth of the spline are glued in part to outer circumferential surfaces and in part to inner circumferential surfaces of the end portion of the hollow profile portion. Since the hollow profile portion has a substantially larger surface compared to a solid full profile portion with the same cross-sectional area, the introduction of force into the fiber composite of the hollow profile portion can be effected via a larger chassis connection surface. An increased loadability of the chassis link is achieved by enlarging the adhesion surface between the end portion of the load introduction element and the end portion of the hollow profile portion. Moreover, loads are introduced more homogeneously into the hollow profile portion through the additional use of inner circumferential surfaces of the end portion of the hollow profile portion. Since a detachment of the surface of a hollow profile portion of fiber-reinforced plastic is an occurring failure behavior, a larger load can be transmitted because the surface of the hollow profile portion is increased compared to a solid full cross section. The failure event described above consisting in the breaking off of the edge layer of the hollow profile end can be prevented in this way or at least put off to substantially higher load ranges.

Further, the spline causes a predominantly positive-engaging force transmission to relatively many surfaces of the hollow profile portion during a bending load on the chassis component particularly when the spline has a relatively large number of teeth. This is also because the teeth have, at their free ends facing the hollow profile portion, a certain compliance perpendicular to the longitudinal direction of the connection portion. In this way, an appreciable reduction in the above-described local stress risers is achieved at the transition from the glued-in end portion of the hollow profile portion to the free region of the hollow profile portion during a bending load. The suggested configuration of the end portion of the load introduction element in connection with the configuration of the end portion of the hollow profile portion with the relatively small thicknesses and the at least one void of the hollow profile portion makes possible a uniform load introduction and load distribution in the connection portion. In contrast with thick-walled profiles, the load in the connection portion is distributed via the edge layer of the hollow profile portion into the interior of its wall and, conversely, from the hollow profile portion via the surface thereof to the teeth of the load introduction element. During a bending load on the hollow profile portion, the connection surfaces of the relatively large number of teeth in the area of the connection portion make possible a kind of positively-engaging force transmission and an appreciable reduction in stress peaks brought about in this way.

As a result of the at least one void, the hollow profile portion has a closed cross section so that a relatively large area moment of inertia and, at the same time, a relatively large torsional moment of inertia are provided. In addition, the spline has at least five teeth, at least one of which engages in the at least one void of the hollow profile portion. In particular, inner surfaces of the void, particularly of the chamber, are the inner circumferential surfaces of the end portion of the hollow profile portion to which the teeth of the spline are glued. The at least four further teeth surround the end portion of the hollow profile portion. In so doing, the four further teeth contact in particular four outer sides of the hollow profile portion which are offset, respectively, by approximately 90 degrees with reference to the cross-sectional geometry, for example, when the hollow profile portion is formed as a rectangular or square tube in the simplest case. In this context, outer circumferential surfaces of the hollow profile portion can all be surfaces which are wetted when the hollow chamber profile is fully immersed in a water bath, the at least one circumferentially closed chamber having been sealed beforehand. In particular, the spline surrounds the end portion of the hollow profile portion only partially, in particular such that the end portion of the hollow profile portion is partially circumferentially exposed.

The end portion of the load introduction element is preferably penetrated in a grate-like manner by through-slots that extend perpendicular to the longitudinal direction of the connection portion and which at least partially intersect at the same time. Accordingly, an imaginary solid full cross section of the end portion of the load introduction element is reduced by the material of the through-slots. Since the through-slots penetrate the end portion of the load introduction element in a grate-like manner, the teeth of the spline constitute the remaining material. The stiffness of the end portion of the load introduction element of metal which is reduced in this way is advantageous for the above-stated reasons when gluing to the end portion of the hollow profile portion comprising a fiber-reinforced plastic. The through-slots preferably intersect at an angle of substantially 90 degrees. In particular, the through-slots extend in two directions to form the grate-like structure. In particular, a plurality of through-slots in each instance extend parallel to one another in each of the two directions perpendicular to the longitudinal direction of the connection portion. Further, through-slots that extend in the same direction perpendicular to the longitudinal direction of the connection portion are preferably formed to be geometrically identical.

In particular, the teeth of the spline have a rectangular or square full cross section along the longitudinal extension thereof in longitudinal direction of the end portion of the load introduction element, and the longitudinal direction of the end portion is preferably identical to, or at least substantially identical to, the longitudinal direction of the connection portion. In particular, the through-slots at least partially have a straight-line shape in longitudinal direction of the end portion of the load introduction element. This means that some through-slots may have a straight-line shape while others may not. In particular, the longitudinal directions of the connection portion, of the end portion of the load introduction element and of the end portion of the hollow profile portion are exactly coextensive or at least substantially coextensive. In particular, the teeth at least partially adjoin through-slots by two of four longitudinal sides extending in longitudinal direction of the end portion of the load introduction element. In particular, the teeth can adjoin through-slots by two, three or four longitudinal sides extending in longitudinal direction of the end portion of the load introduction element. When it is stated that the end portion of the load introduction element is penetrated in a grate-like manner by through-slots which extend perpendicular to the longitudinal direction of the connection portion and which at least partially intersect at the same time, this means that not every through-slot need intersect every other through-slot.

According to an alternative, the through-slots at least partially have an extension deviating from a straight-line extension in longitudinal direction of the connection portion. Through-slots which extend perpendicular to the longitudinal direction of the connection portion and parallel to one another in the same direction at the same time advantageously have the extension deviating from a straight-line extension. In particular, these through-slots deviate from a straight-line extension especially in the same way. Moreover, in particular, these through-slots are formed to be geometrically identical. In particular, the through-slots having the extension deviating from a straight-line extension have unmachined surfaces. In particular, the through-slots, which have the extension deviating from a straight-line extension have, in longitudinal direction of the connection portion, a curved shape with a constant radius of curvature preferably corresponding to the radius of curvature of the associated end portion of the hollow profile portion. In this way, hollow profile portions of curved configuration can be connected to end portions of load introduction elements without difficulty. In particular, the through-slots that have the extension deviating from a straight-line extension extend exactly in longitudinal direction of the connection portion in the area of the tooth roots and depart from this direction to a certain extent toward the free ends of the teeth. It may therefore be stated with respect to this arrangement that the through-slots which have the extension deviating from a straight-line extension also extend in longitudinal direction of the connection portion.

The through-slots extending perpendicular to the longitudinal direction of the connection portion advantageously have a constant width in a first direction and a varying width in a second direction extending perpendicular to the first direction. In particular, all of the through-slots which extend in the same direction perpendicular to the longitudinal direction of the connection portion are formed identically; that is, they have a constant width or a variable width. In particular, the through-slots with constant width have a surface that is machined, preferably cut, particularly milled. In particular, the through-slots with variable width have a surface which is unmachined, particularly extruded, so that no machining costs are incurred. In particular, the through-slots with varying width have an increased width in the area of the tooth roots and/or in the area of the free ends of the teeth.

Free ends of the teeth facing the hollow profile portion advisably have a minimum cross-sectional surface area perpendicular to the longitudinal direction of the connection portion. By this is meant that teeth of the spline, referring to the course of the teeth in longitudinal direction of the connection portion, have the smallest cross-sectional surface area at their free ends. As a result, the teeth have at their free ends an additionally reduced stiffness in longitudinal direction of the connection portion. In particular, the free ends of the teeth facing the hollow profile portion have, perpendicular to the longitudinal direction of the connection portion at least in one extension direction, a greater distance from one another than is the case in at least one other area in longitudinal direction of the connection portion. This is particularly because the through-slots with varying width have a greater width in the area of the free ends of the teeth. In particular, the adhesive by which the end portion of the load introduction element is connected to the end portion of the hollow profile portion has, at least partially, a greater layer thickness in the area of the free ends of the teeth. Owing to the increased adhesive layer thickness, local stresses in the adhesive layer are reduced and are distributed more uniformly to the entire connection portion.

In order to further reduce the stiffness of the end portion of the load introduction element in longitudinal direction of the connection portion, free ends of the teeth facing the hollow profile portion preferably have, at least partially, front concave-shaped recesses which open toward the hollow profile portion. In particular, the through-slots with variable width along longitudinal extension thereof in longitudinal direction of the connection portion have a minimum width in a central portion of the end portion of the load introduction element.

In order to further reduce the stiffness of the end portion of the load introduction element in longitudinal direction of the connection portion, the teeth of the spline are advantageously at least partially tapered at tooth roots at which the teeth transition into solid material of the load introduction element. In particular, tooth roots are tapered at their longitudinal sides which adjoin through-slots with variable width. Since the hollow profile portion has a constant cross section over the longitudinal extension thereof, an at least partially thickened adhesive layer results in the area of the tooth roots. In particular, widened tooth spaces in the area of the tooth roots which result from the tapered tooth roots are filled with adhesive. Owing to the increased adhesive layer thickness, local stresses in the adhesive layer are accordingly reduced and distributed more uniformly to the entire connection portion.

At least one tooth of the spline is preferably formed so as to be continuously tapered over its longitudinal extension toward the hollow profile portion. By this is meant that the at least one tooth has, at its tooth root, a maximum cross-sectional surface area which decreases continuously toward its free end until reaching a minimum at its free end. Accordingly, the at least one tooth has, at the same time, perpendicular to the longitudinal direction of the connection portion, a stiffness which continuously decreases toward the free end thereof in longitudinal direction of the common connection portion. The continuous tapering of the at least one tooth likewise contributes to a continuous transition of the stiffness ratios in longitudinal direction of the common connection portion. In particular, the at least one tooth which continuously tapers toward the hollow profile portion is a corner tooth with two longitudinal sides which extend in longitudinal direction of the end portion of the load introduction element and which adjoin through-slots.

According to a further development of the invention, the load introduction element has a plurality of splined end portions for receiving a plurality of end portions of a plurality of hollow profile portions. The longitudinal directions of the individual end portions can have an angle of 90° relative to one another or an angle that diverges from an angle of 90°. In particular, two longitudinal directions of the individual end portions can have an angle of 180° relative to one another, in particular when the load introduction element serves inter alia or exclusively to connect at least two hollow profile portions to one another.

All of the teeth of the spline preferably have in each instance two unmachined longitudinal sides which extend at least substantially in longitudinal direction of the connection portion. Since the end portion of the load introduction element and the end portion of the hollow profile portion in particular do not directly contact one another—at least not over the whole surface—but rather have a slight tolerance-compensating distance with respect to one another, it is sufficient and, moreover, also economical to leave the longitudinal sides of the teeth at least partially unmachined.

The load introduction element is advantageously a profile portion, particularly an extruded profile portion, with unmachined outer circumferential surfaces and/or inner circumferential surfaces, which extend in a longitudinal profile direction. This has the advantage that relatively inexpensive rod material can be used as starting material for the load introduction element. A cold-drawn or rolled profile portion, for example, is also a possible alternative to the extruded profile portion. In this context, outer circumferential surfaces of the profile portion can all be surfaces that are wetted when the profile portion is completely immersed in a water bath, any voids which may possibly be present having been sealed beforehand. The rest of the surfaces are inner circumferential surfaces when there are voids extending in longitudinal direction of the profile portion. In the context of one aspect of the present invention, a profile portion is a portion of a continuous profile. In particular, the profile portion has a constant cross-sectional geometry over its longitudinal extension. Alternatively, the profile portion can have, in addition to a supporting cross section which is constant over its longitudinal extension, additional function-integrating elements which likewise extend over the entire length of the profile portion or over only a partial length. Particularly in the latter case, however, a cross-sectional area of the profile portion containing the function-integrating elements is initially formed over the entire length thereof and is subsequently cut off if necessary, for example, by sawing. Function-integrating elements can serve, for example, for connecting tubes or hoses for transporting liquid or as cable holders or as a holder for sensor elements or actuator elements or as support for electronics components, for example, for damage detection, or as screw-on surface.

According to an alternative construction of one aspect of the invention, a first load introduction element has a first longitudinal profile direction, and a second load introduction element has a second longitudinal profile direction deviating from the first longitudinal profile direction. In particular, the first longitudinal profile direction and the second longitudinal profile direction have an angular offset of 90 degrees relative to one another. Two first load introduction elements and a second load introduction element can be provided, as was described above, to realize a three-point link.

According to a further alternative, the spline of the load introduction element with the teeth extending at least substantially in longitudinal direction of the connection portion has through-slots which extend at an angle diverging from 90 degrees relative to the longitudinal profile direction of the load introduction element. In particular, such end portions of load introduction elements with through-slots extending at an angle diverging from 90 degrees relative to the longitudinal profile direction of the load introduction element are suitable for connecting hollow profile portions, which likewise extend at an angle diverging from 90 degrees relative to the longitudinal profile direction of the load introduction element. In this case, end faces of the hollow profile portion facing the base of the spline of the load introduction element likewise extend, at least in one direction, at an angle diverging from 90 degrees relative to the longitudinal direction of the hollow profile portion. In particular, the through-slots that extend at an angle diverging from 90 degrees relative to the longitudinal profile direction of the load introduction element are through-slots which are produced by cutting, in particular milled or sawed through-slots.

The angle diverging from 90 degrees can amount to, for example, 60, 70 or 80 degrees. Also applicable in this case is the definition whereby the teeth of the spline extend at least substantially in longitudinal direction of the connection portion. In particular, the through-slots in this embodiment extend in part at an angle diverging from 90 degrees relative to the longitudinal profile direction of the load introduction element and in part at an angle of exactly 90 degrees. The latter through-slots which extend at an angle of exactly 90 degrees relative to the longitudinal profile direction of the load introduction element advantageously have unmachined surfaces originating, for example, from an extrusion process. End portions of load introduction elements with through-slots extending at an angle diverging from 90 degrees relative to the longitudinal profile direction of the load introduction element may have sawed outer surfaces which likewise extend at an angle diverging from 90 degrees relative to the longitudinal profile direction of the load introduction element. These sawed outer surfaces are brought about by diagonally sawing off the load introduction element from a profile rod. In this case, the through-slots as well as the above-mentioned outer surfaces preferably extend at the same angle diverging from 90 degrees relative to the longitudinal profile direction of the load introduction element.

The hollow profile portion is preferably formed as a multi-chamber profile portion. This means that the hollow profile portion, considered in cross section, has at least two voids formed as circumferentially closed chambers. Depending on the geometric layout and the arrangement of the plurality of chambers relative to one another, the area moment of inertia of the hollow profile portion can be increased by a multi-chamber profile portion. This has the result, particularly during a bending load and/or during a torsional load, but also during a compressive load, that higher forces and/or moments can be transmitted. In particular, the multi-chamber profile portion has, in cross section, at least one transverse web by which the plurality of chambers of the multi-chamber profile portion are separated from one another. When gluing the end portion of the hollow profile portion to the end portion of the load introduction element, a transverse web provides additional connection surfaces, which has the effect of evening out the stress distribution in the adhesive layer. If required, the multi-chamber profile portion can have more than one transverse web.

Considered in cross section, the hollow profile portion advantageously has at least one outwardly protruding rib for increasing bending stiffness and/or torsional stiffness and/or buckling strength. In particular, the at least one rib forms a rectangular or square partial cross section of the hollow profile portion cross section. At least one outwardly protruding rib makes it possible to increase the adhesion surface between the end portion of the load introduction element and the end portion of the hollow profile portion. At the same time, the at least one outwardly protruding rib brings about an increase in the area moment of inertia and the torsional moment of inertia of the hollow profile portion. In particular, a longitudinal side of the rib forms an outer surface of the connection portion. In particular, the rib extends in longitudinal direction of the connection portion between two teeth of the spline. If a plurality of ribs is arranged on a cross-sectional side of the hollow profile portion, spaces result between the ribs, which creates the possibility that further teeth of the spline can engage in this additionally provided surface of the hollow profile portion. In particular, the hollow profile portion considered in cross section has at least four outwardly protruding ribs. In particular, two of these at least four ribs are arranged diagonally opposite one another in pairs with respect to the cross section of the hollow profile portion.

Considered in cross section, the hollow profile portion advisably has narrow thickened portions which project from its outer and/or inner circumferential surfaces and by which the end portion of the load introduction element and the end portion of the hollow profile portion are held at a defined minimum distance. In particular, the thickened portions extend in a strip-shaped manner in longitudinal direction of the hollow profile portion over the entire length thereof. The thickened portions serve on the one hand to achieve a minimum layer thickness and, on the other hand, to achieve a uniform layer thickness of the adhesive which connects the end portion of the load introduction element and the end portion of the hollow profile portion. In particular, the thickened portions have spacing surfaces which face the end portion of the hollow profile portion or which contact the end portion of the hollow profile portion or which can be at a slight distance from the latter. More precisely, the surfaces of the end portion of the hollow profile portion located outside of the thickened portions are held at a minimum distance from the end portion of the load introduction element. In particular, the thickened portions serve as guide surfaces when the end portion of the hollow profile portion is inserted into the end portion of the load introduction element. In particular, the thickened portions protrude by less than 0.5 millimeters from the outer and/or inner circumferential surfaces of the hollow profile portion. In particular, considered in cross section of the hollow profile portion, the thickened portions extend by less than 5 millimeters parallel to the associated outer and/or inner circumferential surfaces and are kept relatively narrow. If the thickened portions are too narrow, there is the risk that they will be pushed away when the end portion of the hollow profile portion is inserted into the end portion of the load introduction element. If the thickened portions are too wide, this may have a negative effect on the adhesive connection between the end portion of the load introduction element and the end portion of the hollow profile portion because the optimal layer thickness of the adhesive is not achieved in the area of the thickened portions.

Preferably, at least one intermediate space between two teeth is filled exclusively with an adhesive inside of the connection portion. In particular, this adhesive at the same time forms a part of the outer circumferential surface of the connection portion. In particular, the adhesive is located between the at least two teeth in a through-slot with constant width. Particularly when such a through-slot with constant width is milled or sawed, it is contemplated to produce the through-slot in a continuous manner perpendicular to the longitudinal direction of the connection portion in order to prevent increased machining costs, for example, by plunge milling. If an intermediate space, which is not filled by the end portion of the hollow profile portion, for example, a rib of this end portion, should result between two teeth when the through-slot is produced in a continuous manner, it is recommended that this intermediate space be filled with the adhesive in order to protect the intermediate space from soiling and possibly also against corrosion through dirt, dust, splashing water or road salt, etc. during driving operation. In particular, the intermediate space is filled in such a way that the adhesive is flush with the outer circumference of the connection portion.

BRIEF DESCRIPTION OF THE DRAWINGS

The invention will be described in more detail in the following referring to drawings which merely represent embodiment examples. Like reference numerals designate like, similar or functionally like component parts or elements. The drawings show:

FIG. 3 is a side view of the load introduction element according to FIG. 2;

FIG. 4 is a side view of the load introduction element according to FIGS. 2 and 3 rotated by 90 degrees with reference to FIG. 3;

FIG. 5 is a side view of a load introduction element;

DETAILED DESCRIPTION OF THE PRESENTLY PREFERRED EMBODIMENTS

Figure 1:
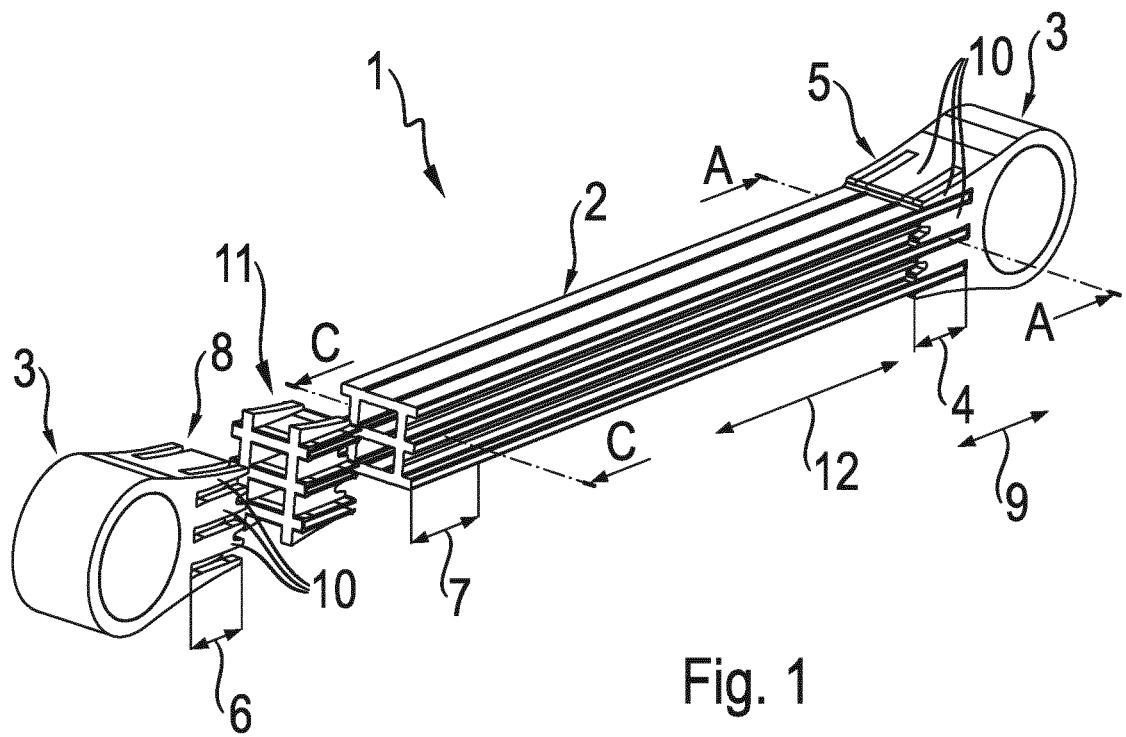
FIG. 1 is a perspective, partially exploded view of a chassis link.

FIG. 1 shows a chassis link 1, also referred to as axle strut, formed as a two-point link. The chassis link 1 has a pultruded hollow profile portion 2 of fiber-reinforced plastic and two load introduction elements 3 of aluminum. The hollow profile portion 2 and the load introduction elements 3 are connected to one another in common connection portions 4 via nondetachable glued plug-in connections 5. With respect to the two plug-in connections 5, an end portion 6 of the load introduction element 3 and an end portion 7 of the hollow profile portion 2 mutually engage one inside the other substantially in positive engagement. The end portion 6 of the load introduction element 3 has a spline 8 with twelve teeth 10 extending in longitudinal direction 9 of the common connection portion 4 so that the stiffness of the end portion 6 of the load introduction element 3 in longitudinal direction 9 of the common connection portion 4 is reduced. In the common connection portion 4, the end portion 7 of the hollow profile portion 2 and the end portion 6 of the load introduction element 3 are connected to one another by an adhesive 11 over the entire surface and so as to be free of voids. For the sake of clarity, the hardened adhesive 11 is shown separately in the exploded view of the end of the chassis link 1. The adhesive 11 only has a layer thickness of, on average, approximately 0.5 millimeters, because of which, inter alia, the end portion 6 of the load introduction element 3 and the end portion 7 of hollow profile portion 2 engage one inside the other substantially in a positive engagement. Since the hollow profile portion 2 is formed to be straight in the present instance, the longitudinal direction 9 of the connection portion 4 corresponds to the longitudinal direction 12 of the hollow profile portion 2.

Figure 2:
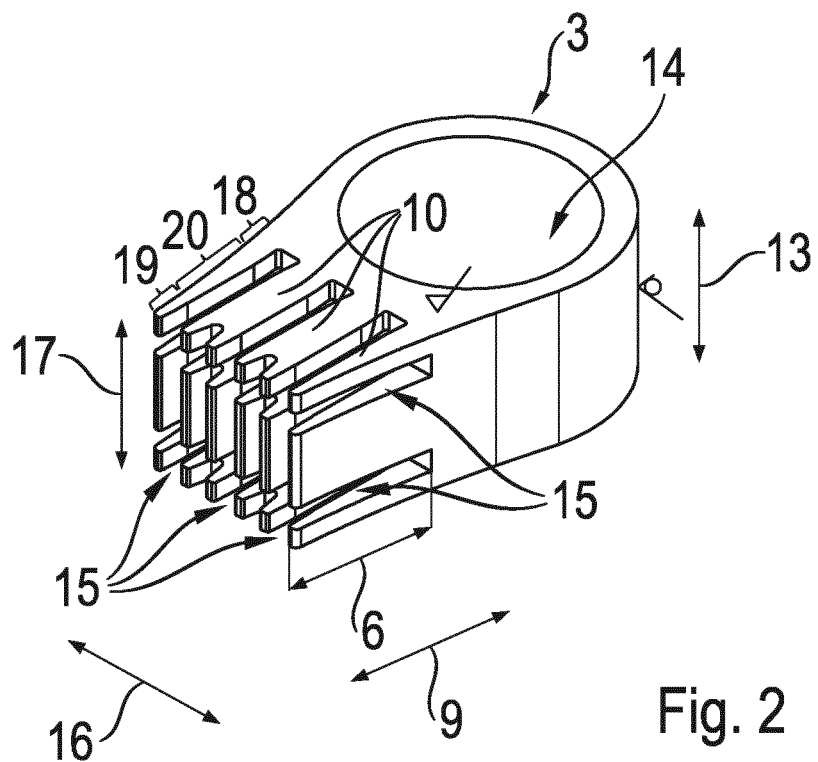
FIG. 2 is a perspective view of a load introduction element of the chassis link according to FIG. 1.

The load introduction element 3 which is shown separately in FIG. 2 is formed as an extruded profile portion which extends in a column-like manner in a longitudinal profile direction 13. The load introduction element 3 is produced by sawing off an extruded rod material in longitudinal profile direction 13. Outer circumferential surfaces of the load introduction element 3 which likewise extend in longitudinal profile direction 13 are unmachined and correspond to the surface condition of the extruded rod material. One visible surface of a total of two surfaces produced by sawing is provided with a designation (symbol with closed triangle) according to DIN EN ISO 1302 for a surface with removal of material by machining. An unmachined surface of the load introduction element 3, which does not undergo removal of material by machining and which is, at the same time, a surface of the extruded rod-shaped starting material, is labeled analogously with a symbol having an open triangle with an inscribed circle. In addition to the spline 8, the load introduction element 3 has a through-opening 14 for receiving a molecular joint, not shown. The end portion 6 of the load introduction element 3 is penetrated in a grate-like manner by through-slots 15 which extend perpendicular to the longitudinal direction 9 of the connection portion 4 and which partially intersect at the same time. The teeth 10 are formed by the aluminum remaining between the through-slots 15. The spline 8 has four corner teeth 10 which are formed to taper continuously over the longitudinal extension thereof toward the hollow profile portion 2 so as to further reduce stiffness. The four corner teeth 10 have, in each instance, four surfaces that extend in longitudinal direction 9 of the connection portion 4 and form the extent of the corner teeth 10 in this direction. Of these four surfaces, one is sawed, one is milled and two are unmachined surfaces of the extruded rod-shaped starting material. Two through-slots 15 that extend in a first direction 16 are produced by milling with a side milling cutter and have a constant width. Three through-slots 15 that extend in a second direction 17 oriented perpendicular to the first direction 16 and coextensive with the longitudinal profile direction 13 are extruded through-slots 15 of the rod-shaped starting material and have a varying width.

In the first direction 16, the teeth 10 of the spline 8 are formed in a tapered manner at tooth roots 18 at which the teeth 10 transition into solid material of the load introduction element 3. Free ends 19 of the teeth 10 facing the hollow profile portion 2 have a minimum cross-sectional surface area perpendicular to the longitudinal direction 9 of the connection portion 4. The through-slots 15 with varying width which extend in the second direction 17 have an increased width in the area of the tooth roots 18 and in the area of the free ends 19 of the teeth 10 in the first direction 16. It will be discerned that the corner teeth 10 have a maximum cross-sectional surface area at the tooth roots 18 thereof which continuously decreases toward the free ends 19 thereof. In a middle, considered in longitudinal direction 9 of the connection portion 4, portion 20 of the teeth 10 arranged between the tooth roots 18 and the free ends 19 of the teeth 10, the through-slots 15 with variable width have a minimum width in the first direction 16. The teeth 10 have a length in longitudinal direction 9 of the connection portion 4 that is, in some teeth 10, approximately twice the size of a maximum width of these teeth 10. However, in the majority of teeth 10, this length is substantially greater than the maximum width of the teeth 10.

It will be discerned in FIG. 3 that the load introduction element 3 has a function-integrating element 21 formed as a cable holder at its end opposite the spline 8 considered in longitudinal direction 9 of the connection portion 4. The circumferential contour of the function-integrating element 21 is extruded and is not further machined, which is apparent from the symbol with open triangle and inscribed circle which was described above. The tooth roots 18 extend approximately 10 millimeters in longitudinal direction 9 of the connection portion 4, the middle portion 20 extends approximately 25 millimeters and the free end 19 of the teeth 10 extends approximately 10 millimeters in the same direction. The total length of the teeth 10 of approximately 45 millimeters substantially corresponds to the length of the end portion 6 of the load introduction element 3 measured in the same direction as before. Measured in the first direction 16, the three through-slots 15 with varying width have a maximum width of approximately 8.5 millimeters at the base thereof, which at the same time corresponds to a base 24 of the spline 8, approximately 7 millimeters in the middle portion 22 and approximately 7.75 millimeters at the free end 19 of the teeth 10. It is also clearly shown that the teeth 10 of the spline 8 are formed to taper at the tooth roots 18 thereof in the first direction 16 to further reduce the stiffness of the end portion 6 of the load introduction element 3 in longitudinal direction 9 of the common connection portion 4. Further, it is made clear by the above-mentioned symbols with the open triangle and the inscribed circle that all of the teeth 10 of the spline 8 have, in each instance, two unmachined extruded longitudinal sides that extend substantially in longitudinal direction 9 of the connection portion 4. In order to further reduce the stiffness of the end portion 6 of the load introduction element 3 in longitudinal direction 9 of the common connection portion 4, the free ends 19 of the teeth 10 facing the hollow profile portion 2 have recesses 23 which are partially on the front side, concave-shaped and open toward the hollow profile portion 2.

It will be discerned from FIG. 4 that the two through-slots 15 of the load introduction element 3 with constant width in the second direction 17, approximately 7 millimeters in the present instance, have a surface produced by removal of material, which is identified by the above-mentioned symbols with the closed triangle. In this embodiment example, the second direction 17 is identical to the longitudinal profile direction 13. The function-integrating element 21 is formed in the longitudinal profile direction 13 over the entire length of the load introduction element 3 in the second direction 17 in the initial state indicated in dash-dot lines. In the depicted finished state of the load introduction element 3, two symmetrically arranged areas of the initial state are notched by a material-removing process. The corresponding surface specifications are shown analogous to the preceding description.

FIG. 5 shows a load introduction element 3 with a spline 8 with teeth 10 extending substantially in longitudinal direction 9 of the connection portion 4. The spline 8 has milled through-slots 15 with constant width in the second direction 17 that extend at the same angle a diverging from 90 degrees relative to the longitudinal profile direction 13 of the load introduction element 3 as the longitudinal direction 9 of the connection portion 4. The load introduction element 3 has sawed outer surfaces which result from diagonally sawing off the load introduction element 3 from a profile rod, extend at the same angle a diverging from 90 degrees relative to the longitudinal profile direction 13 as the milled through-slots 15, and are identified by the above-described symbol with closed triangle. The load introduction element 3 further has unmachined through-slots 15, not shown, with varying width in the first direction 16 that have the extruded surfaces and extend in longitudinal profile direction 13.

Figure 6:
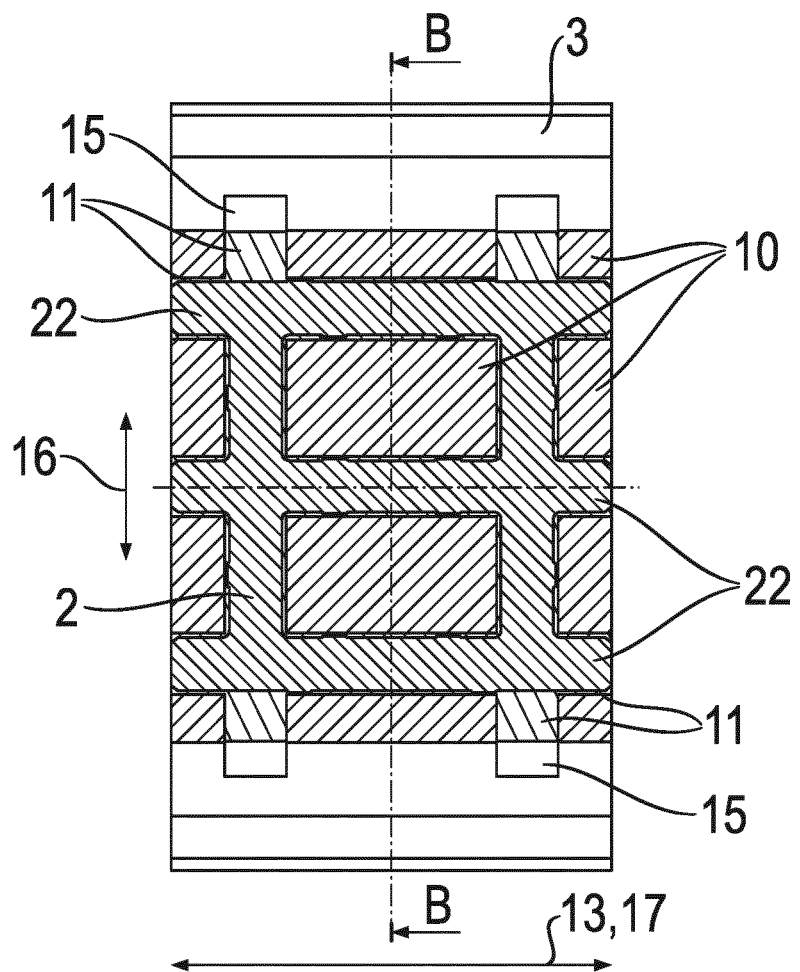
FIG. 6 is a sectional view of the chassis link according to FIG. 1 along the section line A-A indicated in FIG. 1.

FIG. 6 shows the load introduction element 3, wherein the teeth 10 of the spline 8 have a rectangular full cross section over the longitudinal extension thereof in longitudinal direction 9 of the connection portion 4. In the selected section plane, the four corner teeth happen to have a square full cross section as special shape of a rectangular full cross section. The two end areas of the two through-slots 15 with constant width which extend in the first direction 16 are filled with the adhesive 11 which forms an outer circumferential surface of the connection portion 4 in these four areas. In other words, in the present case, four intermediate spaces between every two teeth 10 are exclusively filled with the adhesive 11 inside of the connection portion 4. Outside of these intermediate spaces, the layer thickness of the adhesive 11 amounts to approximately 0.5 millimeters on the average. In the present section, in order to increase the bending stiffness, the torsional stiffness and the buckling strength of the chassis link 1, the hollow profile portion 2 has six ribs 22 protruding outward and extending in the second direction 17 at the same time. Front sides of these six ribs 22 form partial outer circumferential surfaces of the connection portion 4. FIG. 6 also shows that the teeth 10 of the spline 8 are glued in part to outer circumferential surfaces and in part to inner circumferential surfaces of the end portion 7 of the hollow profile portion 2.

Figure 7:
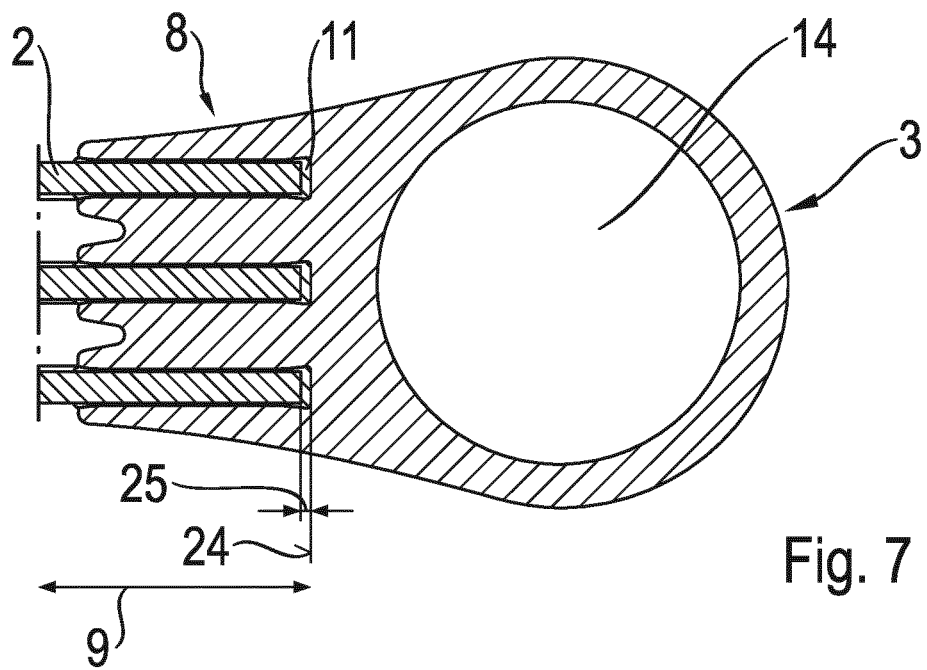
FIG. 7 is a partial sectional view of the chassis link according to FIG. 1 along the section line B-B indicated in FIG. 6.

FIG. 7 shows that the hollow profile portion 2 is not inserted into the spline 8 in longitudinal direction 9 of the common connection portion 4 up to the stop, but rather that a gap 25 filled with adhesive 11 remains between a front side of the hollow profile portion 2 facing the load introduction 3 and the base 24 of the spline 8.

Figure 8:
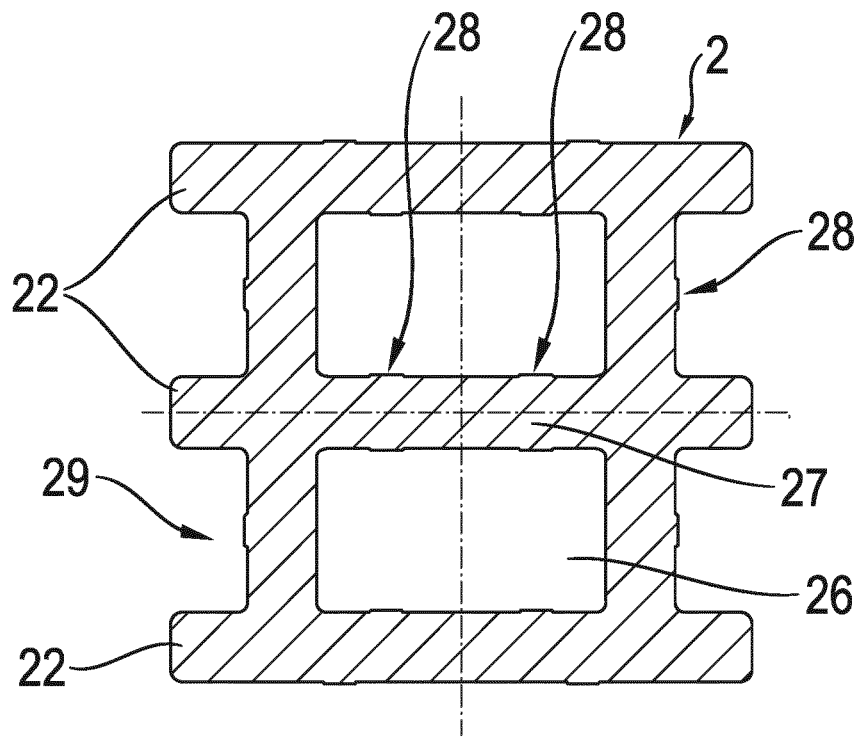
FIG. 8 is a sectional view of the chassis link according to FIG. 1 along the section line C-C indicated in FIG. 1.

FIG. 8 shows the hollow profile portion 2 in a section through the end area 7 thereof. The hollow profile portion 2 is formed as a multi-chamber profile portion with two circumferentially closed chambers 26. The two chambers 26 are separated from one another by a transverse web 27. In the assembled state, the two chambers 26 are filled in each instance by a tooth 10. The hollow profile portion 2 considered in the present cross section has narrow thickened portions 28 projecting from its outer circumferential surfaces and from its inner circumferential surfaces. The end portion 6 of the load introduction element 3 and the end portion 7 of the hollow profile portion 2 are held at a defined minimum distance by these thickened portions 28. The thickened portions 28 extend not only over the end portion 7 of the pultruded hollow profile portion 2 but also in a stripe-shaped manner over the entire length thereof. In the present instance, the thickened portions 28 protrude by approximately 0.3 millimeters from the above-mentioned outer and inner circumferential surfaces and have a width of approximately 3 millimeters. The thickened portions 28 present guide surfaces when the end portion 7 of the hollow profile portion 2 is inserted into the end portion 6 of the load introduction element 3. In the area of the thickened portions 28, the amount of the layer thickness of the adhesive 11 is calculated to be 0.2 millimeters so that it is clear that the end portion 6 of the load introduction element 3 and the end portion 7 of the hollow profile portion 2 mutually engage in one another with only slight play, i.e., substantially in a positive engagement. It is noted that the inner circumferential surfaces of the hollow profile portion 2 are identical to the inner circumferential surfaces of the two chambers 26. The six outwardly protruding ribs 22 which have already been discussed are also clearly shown. Spaces 29 in which a tooth 10 of the spline 8 engages in each instance in the assembled state are formed between every two ribs on one cross-sectional side of the hollow profile portion 2.

Figure 9:
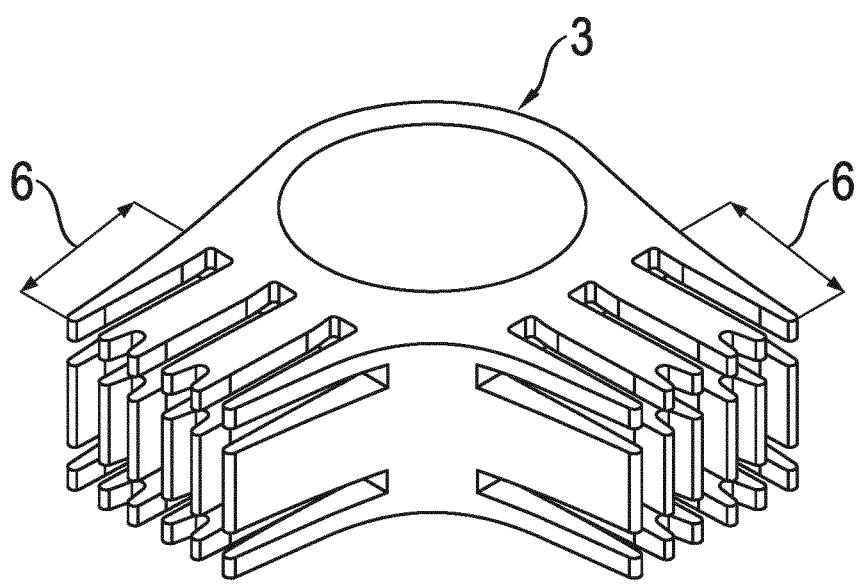
FIG. 9 is a perspective view of a load introduction element.

FIG. 9 shows a load introduction element 3 with two splined end portions 6 for receiving an end portion 7 of a hollow profile portion 2 in each instance. The two end portions 6 of the load introduction element 3 form an angle of 90 degrees relative to one another.

Figure 10A:
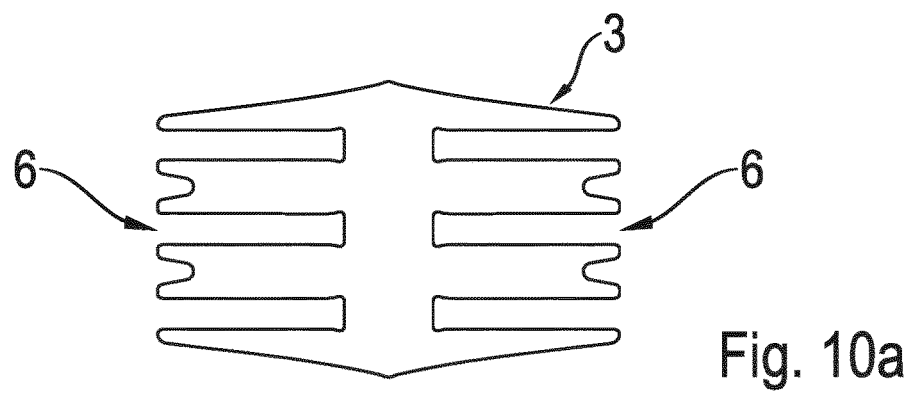
FIGS. 10a to 10c are load introduction elements according in a top view in each instance.

FIG. 10a shows a load introduction element 3 with two splined end portions 6 which have an angle of 180 degrees relative to one another and open in opposite directions at the same time. A load introduction element 3 of this kind can function, for example, as a connector which connects two hollow profile portions 2 to one another.

Figure 10B:
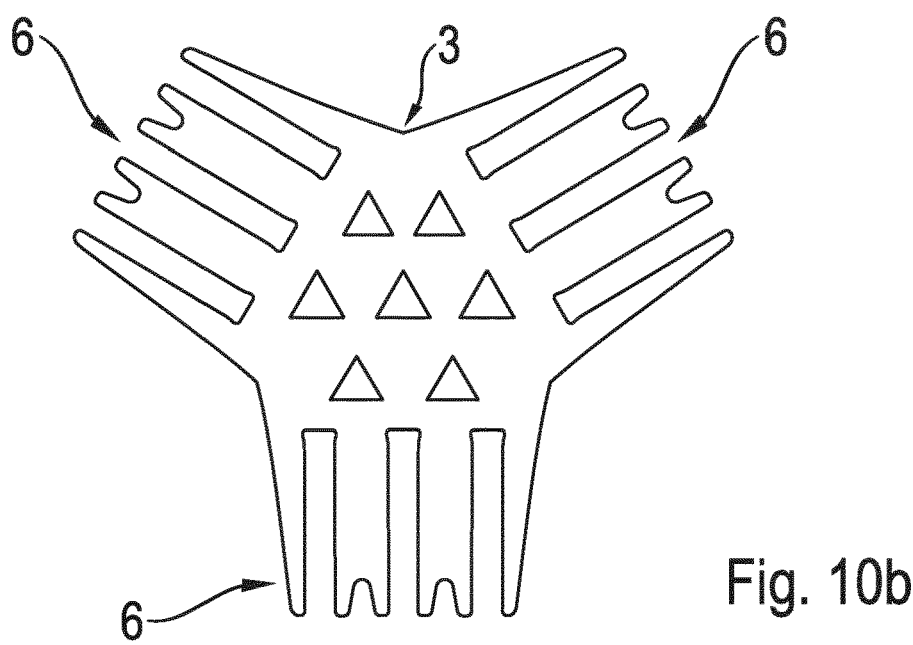

FIG. 10b shows a load introduction element 3 with three splined end portions 6 which are arranged so as to be offset by 120 degrees and which lie in a plane. A middle area of the load introduction element 3 has triangular column-shaped openings to prevent a disadvantageous accumulation of material in this area caused by manufacturing.

Figure 10C:
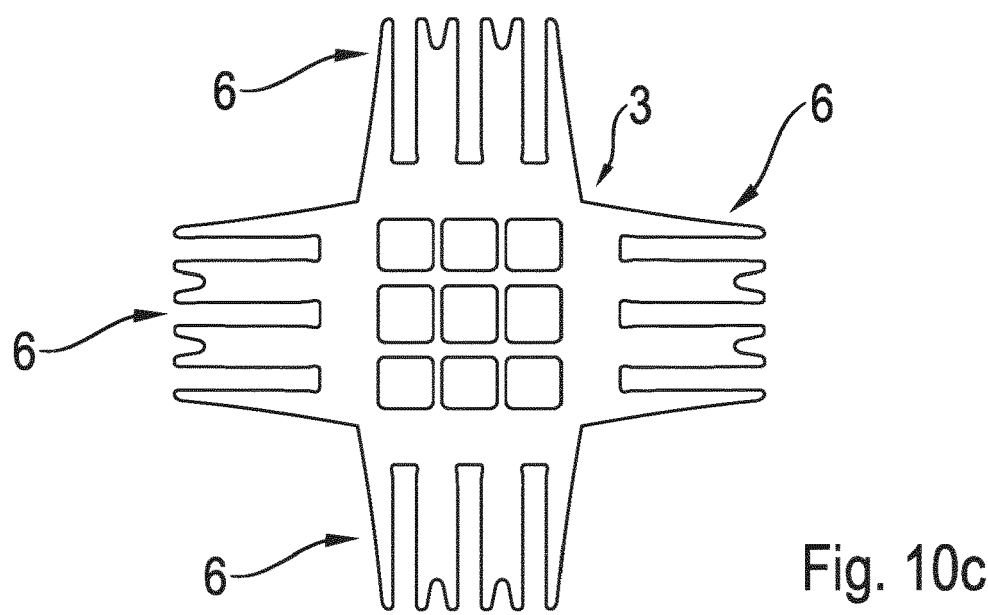

A load introduction element 3 shown in FIG. 10c has four splined end portions 6 which are arranged so as to be offset by 90 degrees and which lie in a plane. The square recesses shown in the middle area of the load introduction element 3 are likewise column-shaped and serve the same purpose as that described above.

Load introduction elements 3 with more than four end portions 6 can be formed in a manner analogous to the arrangements described above. The three load introduction elements mentioned above referring to FIGS. 10a to 10c are extruded load introduction elements 6 with a longitudinal profile direction 13 extending perpendicular to the drawing plane.

Figure 11:
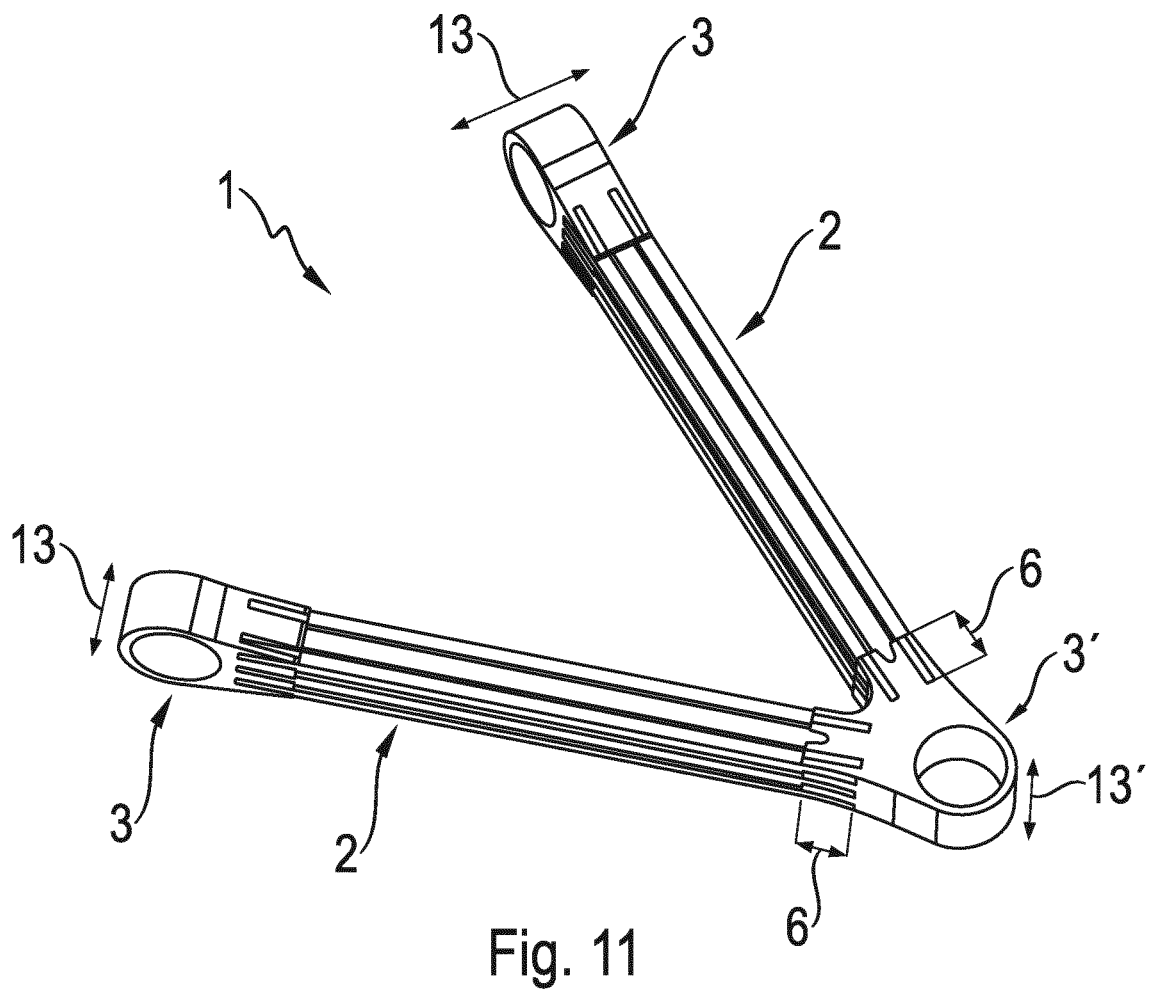
FIG. 11 is a perspective view of a chassis link.

FIG. 11 shows a chassis link 1 formed as a three-point link. This chassis link 1 has two first load introduction elements 3 with first longitudinal profile directions 13 that extend in a common plane. A second load introduction element 3' has a second longitudinal profile direction 13' that extends perpendicular to the common plane in which the two first longitudinal profile directions 13 extend. In all three load introduction elements 3, 3', the longitudinal profile directions 13, 13' coincide with the previously described second directions 17 in which through-slots 15 with varying width extend in each instance. Analogous to the preceding description, these through-slots 15 have an increased width in the area of the tooth roots 18 and in the area of the free ends 19 of the teeth 10 in the first direction 16. The second load introduction element 3' has two splined end portions 6 for receiving two end portions 7 of two hollow profile portions 2.

Figure 12:
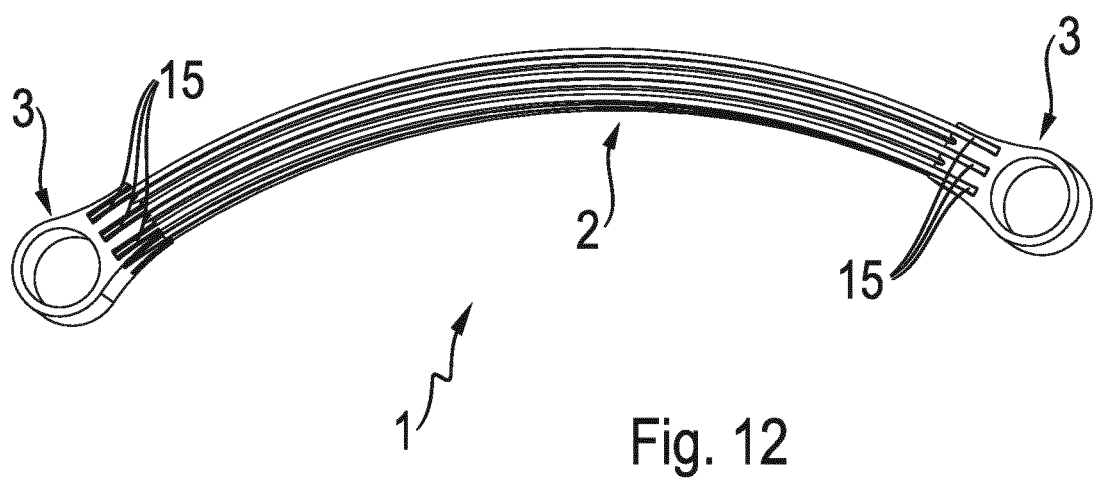
FIG. 12 is a perspective view of a chassis link.

FIG. 12 shows a chassis link 1 formed as a two-point link and which has two geometrically identical load introduction elements 3 which are connected to one another by a hollow profile portion 2. The hollow profile portion 2 is curved and has a constant radius of curvature over its entire longitudinal extension. In order that the curved hollow profile portion 2 can be inserted without difficulty into splines 8 of the load introduction elements 3, through-slots 15 of the splines 8 partially also have an extension deviating from a straight-line extension in longitudinal directions 9 of connection portions 4. Specifically, the through-slots 15 of the splines 8 have the same radius of curvature as the hollow profile portion 2. The curvatures of the hollow profile portion 2 and of the curved through-slots 15 all lie in a plane which is defined by the arcuate hollow profile portion 2 and a chord joining the ends thereof. The curved through-slots 15 of the two load introduction elements 3 extend in longitudinal profile directions 13 according to the definition given above and further have unmachined extruded inner surfaces. Further, the curved through-slots 15 have a varying width along their extension in longitudinal directions 9 of connection portions 4.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A component part, formed as a chassis link, for a motor vehicle, comprising:
    a hollow profile portion of a fiber-reinforced plastic;
    a load introduction element of a metal material; and
    a common connection portion at which the hollow profile portion and the load introduction element are connected to one another via a nondetachable, glued plug-in connection in which an end portion of the load introduction element and an end portion of the hollow profile portion mutually engage in one another at least substantially by positive engagement;
    wherein the end portion of the load introduction element has a spline with teeth extending at least substantially in longitudinal direction of the common connection portion so that a stiffness of the end portion of the load introduction element is reduced in longitudinal direction of the common connection portion,
    wherein the hollow profile portion has at least one void formed as a circumferentially closed chamber, and
    wherein the spline has at least five teeth, at least one of which engages in the at least one void of the hollow profile portion.

2. The component part according to claim 1, wherein the teeth of the spline are glued in part to outer circumferential surfaces and in part to inner circumferential surfaces of the end portion of the hollow profile portion.

3. The component part according to claim 1, wherein the end portion of the load introduction element is penetrated in a grate-like manner by through-slots that extend perpendicular to the longitudinal direction of the common connection portion and which at least partially intersect at the longitudinal direction of the common connection portion.

4. The component part according to claim 3, wherein the through-slots at least partially have an extension deviating from a straight-line extension in longitudinal direction of the common connection portion.

5. The component part according to claim 3, wherein the through-slots extending perpendicular to the longitudinal direction of the common connection portion have a constant width in a first direction and a varying width in a second direction extending perpendicular to the first direction.

6. The component part according to claim 1, wherein free ends of the teeth facing the hollow profile portion have a minimum cross-sectional surface area perpendicular to the longitudinal direction of the common connection portion.

7. The component part according to claim 1, wherein free ends of the teeth facing the hollow profile portion have, at least partially, front recesses of concave shape that open toward the hollow profile portion to reduce the stiffness of the end portion of the load introduction element in the longitudinal direction of the common connection portion.

8. The component part according to claim 1, wherein the teeth of the spline are at least partially tapered at tooth roots at which the teeth transition into solid material of the load introduction element to reduce the stiffness of the end portion of the load introduction element in longitudinal direction of the common connection portion.

9. The component part according to claim 1, wherein at least one tooth of the spline is formed so as to be continuously tapered over its longitudinal extension toward the hollow profile portion.

10. The component part according to claim 1, wherein the load introduction element has a plurality of splined end portions configured to receive a plurality of end portions of a plurality of hollow profile portions.

11. The component part according to claim 1, wherein all of the teeth of the spline have in each instance two unmachined longitudinal sides that extend at least substantially in the longitudinal direction of the common connection portion.

12. The component part according claim 1, wherein the load introduction element is a profile portion, configured as an extruded profile portion, with unmachined outer circumferential surfaces and/or inner circumferential surfaces that extend in a longitudinal profile direction.

13. The component part according to claim 12, wherein a first load introduction element has a first longitudinal profile direction, and a second load introduction element has a second longitudinal profile direction deviating from the first longitudinal profile direction.

14. The component part according to claim 12, wherein the spline of the load introduction element with the teeth extending at least substantially in the longitudinal direction of the common connection portion has through-slots which extend at an angle diverging from 90 degrees relative to the longitudinal profile direction of the load introduction element.

15. The component part according to claim 1, wherein the hollow profile portion is formed as a multi-chamber profile portion.

16. The component part according to claim 1, wherein the hollow profile portion, considered in cross section, has at least one outwardly protruding rib configured to increase bending stiffness and/or torsional stiffness and/or buckling strength.

17. The component part according to claim 1, wherein the hollow profile portion, considered in cross section, has narrow thickened portions that project from its outer and/or inner circumferential surfaces and by which the end portion of the load introduction element and the end portion of the hollow profile portion are held at a defined minimum distance.

18. The component part according to claim 1, wherein at least one intermediate space between two teeth is filled exclusively with an adhesive inside of the common connection portion.

* * * * *